US007054427B2

(12) United States Patent
Malik (10) Patent No.: US 7,054,427 B2
(45) Date of Patent: May 30, 2006

(54) SYSTEM AND METHOD FOR ENHANCED INTERNET SERVICE CONNECTIONS

(75) Inventor: Dale W. Malik, Dunwoody, GA (US)

(73) Assignee: Bellsouth Intellectual Property Corporation, Wilmington, DE (US)

(*) Notice: Subject to any disclaimer, the term of this patent is extended or adjusted under 35 U.S.C. 154(b) by 233 days.

(21) Appl. No.: 10/360,857

(22) Filed: Feb. 10, 2003

(65) Prior Publication Data
US 2003/0138093 A1 Jul. 24, 2003

Related U.S. Application Data

(63) Continuation of application No. 09/456,322, filed on Dec. 8, 1999, now Pat. No. 6,519,333.

(51) Int. Cl.
*H04M 3/42* (2006.01)
(52) U.S. Cl. .................. 379/207.02; 379/221.09
(58) Field of Classification Search ............... None
See application file for complete search history.

(56) References Cited

U.S. PATENT DOCUMENTS

| 5,701,301 A | 12/1997 | Weisser, Jr. |
| 5,774,533 A | 6/1998 | Patel |
| 5,923,659 A | 7/1999 | Curry et al. |
| 5,933,490 A | 8/1999 | White et al. |
| 5,991,377 A | 11/1999 | Malik |
| 6,181,695 B1 | 1/2001 | Curry et al. |
| 6,233,313 B1 | 5/2001 | Farris et al. |
| 6,295,351 B1 | 9/2001 | Malik et al. |
| 6,324,269 B1 | 11/2001 | Malik |
| 6,330,250 B1 | 12/2001 | Curry et al. |
| 6,345,047 B1 | 2/2002 | Regnier |
| 6,359,880 B1 | 3/2002 | Curry et al. |
| 6,404,885 B1* | 6/2002 | Field et al. ............ 379/266.04 |
| 6,415,027 B1 | 7/2002 | Malik |
| 6,442,169 B1 | 8/2002 | Lewis |

OTHER PUBLICATIONS

Bellcore Technical Reference TRNWT-001284, Issue 1, "Advanced Intelligent Network (AIN) 0.1 Switching Systems Generic Requirements" (Aug. 1992).
Bellcore Document No. GR-1298-CORE, "AINGR: Switching Systems".

* cited by examiner

*Primary Examiner*—Creighton Smith
(74) *Attorney, Agent, or Firm*—Walters & Zimmerman; Geoff Sutcliffe; Todd Mitchem (57) ABSTRACT

The present invention discloses a system and method for marking telephone calls from a subscriber to an Internet Service Provider ("ISP") with a class of service marker. Using this system and method, subscribers can obtain enhanced connections to their ISPs based on their class of service. An ISP can designate several different levels, or classes of service which their subscribers may choose. Generally, with higher the classes of service, the subscriber will have a greater opportunity for a successful dial-up connection to the ISP. The telephone service provider uses a class of service scheme provided by the ISP to determine the best route for the call. Additionally, the class of service marker is made available to the ISP in a manner such that the ISP can determine the caller's class of service without actually answering the call. Thus, two levels of enhanced ISP connections are provided. First, the telephone service provider ("telco") can use the COS to determine the best route for each individual call. Second, once a call has been routed to the ISP, the ISP can determine the COS prior to answering the call and can make a business decision whether or not the call should be answered.

14 Claims, 6 Drawing Sheets

SYSTEM AND METHOD FOR ENHANCED INTERNET SERVICE CONNECTIONS

Continuation of prior application Ser. No. 09/456,322, filed Dec. 8, 1999, now U.S. Pat. No. 6,519,333.

BACKGROUND

1. Field of the Invention

The present invention relates generally to telecommunications systems. More particularly, the present invention relates to an advanced intelligent network system providing enhanced Internet service connections.

2. Background of the Invention

Figure 1:
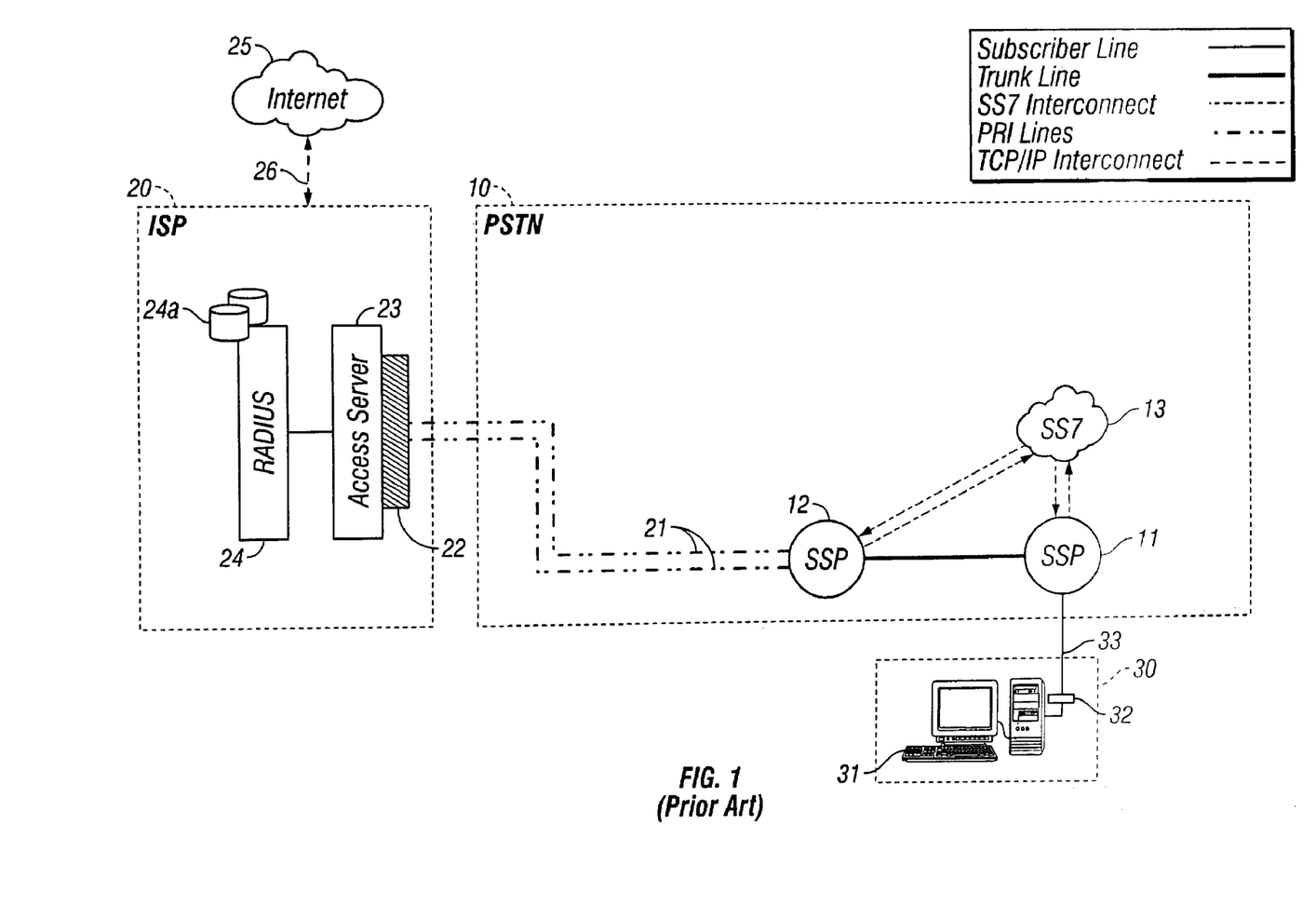
FIG. 1 is a schematic diagram of the main components of a telephone service provider's network and an Internet Service Provider's ("ISP") network used in establishing a dial-up connection to the Internet in conventional ISP systems.

Over the last ten years, use of the Internet has grown rapidly. A large segment of this growth stems from an increase in individual dial-up subscribers. These dial-up subscribers use the public switched telephone network ("PSTN") to establish connections to their Internet Service Providers ("ISPs"). FIG. 1 is a schematic diagram illustrating how these dial-up subscribers, or users, connect to their ISPs using PSTN 10. To support multiple connections, ISPs must maintain numerous telephone lines connected to modems. Rather than advertising a different telephone number for each telephone line, ISPs generally advertise a limited number of telephone access numbers. Each telephone access number corresponds to one or more telephone lines. These telephone lines may be made up of, e.g., individual plain old telephone service ("POTS") lines, one or more T1 lines, or Primary Rate Integrated Services Digital Network ("PRI") lines. For simplicity, the figures and discussion herein show the connection to be made up of PRI lines 21, as shown in FIG. 1.

PRI lines 21 lead to ISP 20 where they are connected to multi-line hunt group ("MLHG") 22 as shown in FIG. 1. MLHG 22 is a modem pool allowing multiple simultaneous connections and is controlled by access server 23. MLHG 22 takes incoming subscriber calls and routes them to the first open modem in the modem pool. When caller 30 dials the telephone access number for ISP 20 (using computer 31, modem 32 and subscriber line 33), PSTN 10 processes the call like any other call. That is, the call is routed between caller 30 and the called party (in this case, ISP 20) through one or more switches. If the ISP's lines are all busy, or "off-hook," i.e., there are no voice communication paths available, the caller gets a busy signal, which is provided by PSTN 10. On the other hand, if lines are available, the ISP's switch terminates the call and it is the ISP's responsibility to answer the call, verify the user authorization to access the ISP's system, and set up the caller's connection to the Internet.

When a call reaches ISP 20 via PRI lines 21 and MLHG 22, access server 23 answers the call and determines whether the caller is a valid ISP subscriber. If the caller is a valid subscriber, then access server 23 must determine which services the caller should have access to. Access server 23 queries caller 30 for information such as a username and password for use in validating caller 30 and determining caller 30's authorized services. The dialog between caller 30 and access server 23 is usually performed automatically between access server 23 and communications software operating on computer 31.

Generally, ISPs use centralized servers to store and manage their subscriber databases. Remote Authentication Dial-In User Service ("RADIUS") server 24, having database 24a, shown in FIG. 1, is functionally connected to access server 23 and provides this centralized management. Thus, access server 23 collects username and password information from caller 30 and passes it on to RADIUS server 24. After RADIUS server 24 verifies caller 30's username and password, it provides access server 23 with configuration information specific to caller 30. Access server 23 uses the configuration information to provide the authorized services to caller 30. Access servers and RADIUS servers are described in more detail in commonly assigned U.S. patent application Ser. No. 09/133,299, which is incorporated herein by reference in its entirety. Additional information on access servers and RADIUS servers may be found in Rigney et al., *Remote Authentication Dial-In User Service (RADIUS)*, Network Working Group, January 1997, or in Rigney et al., *RADIUS Accounting*, Network Working Group, April 1997.

It is well known in the art that not all subscribers connect to their ISPs at the same time. Additionally, not all subscribers connect every day, nor do they connect for the same length of time each session. For this reason, it is not practical or realistic for ISPs to provide a 1:1 ratio of lines to subscribers. ISPs must pay their local telephone service providers for each telephone line maintained. Instead, ISPs have developed formulas to determine the appropriate number of telephone lines required. In general, a telephone line to user ratio of at least 1:10 provides an acceptable level of service. However, as Internet usage continues to grow, it is becoming more difficult to predict the telephone line requirements for an ISP.

In the conventional system described above, all callers are given equal priority within telephone network 10 and by ISP 20. That is, all calls are handled on a first-come, first-served basis. If the ISP has an open telephone line, the call is terminated and the ISP answers the call, regardless of whether or not the caller is a valid ISP subscriber. If the caller is a valid ISP subscriber, the caller gains access to the ISP's resources. Otherwise, RADIUS server 24 instructs access server 23 to disconnect the call. On the other hand, if the ISP does not have any open telephone lines, all callers, even valid ISP subscribers, are denied access because no calls can be connected to the ISP for verification.

Figure 2:
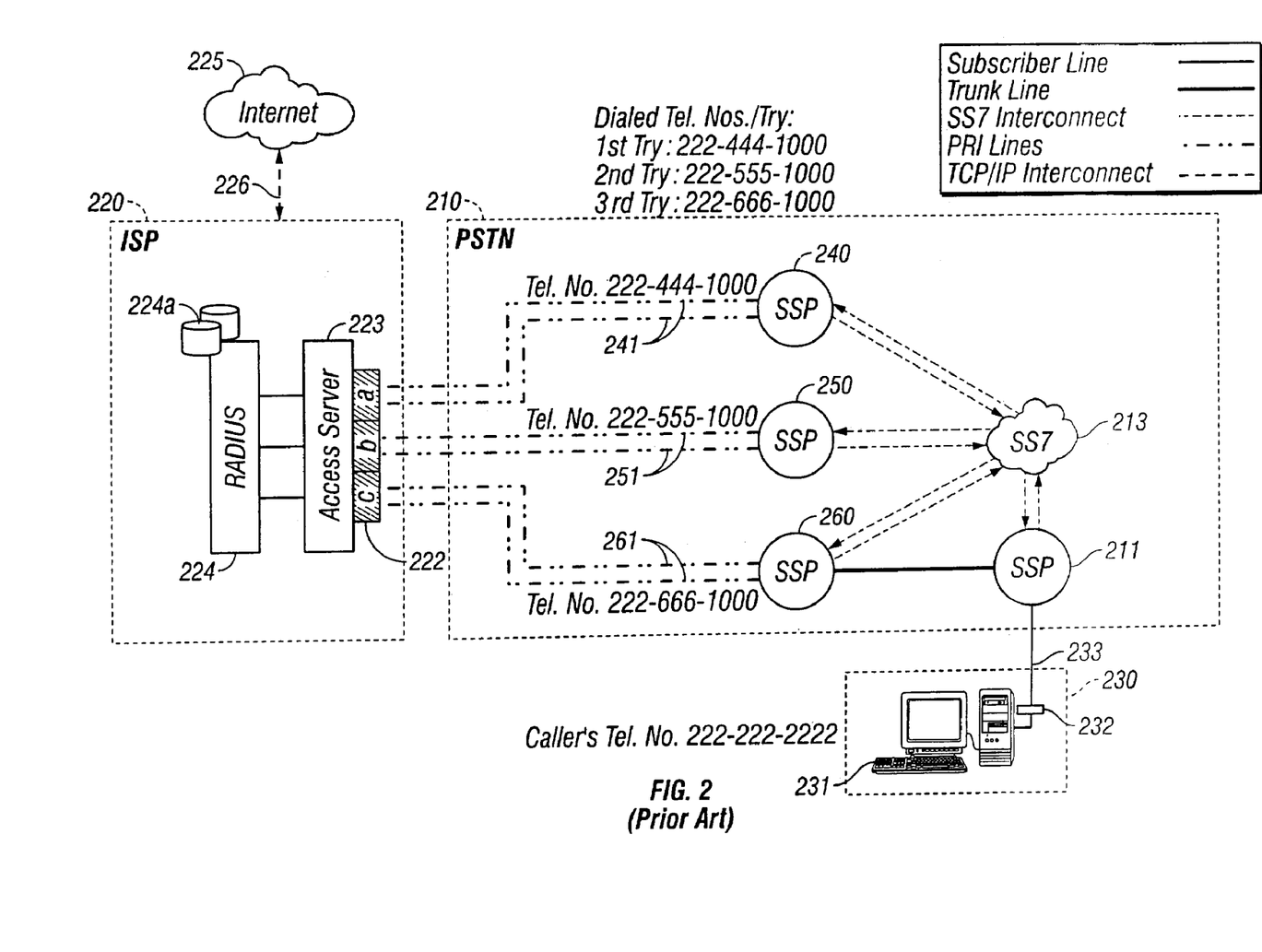
FIG. 2 is a schematic diagram of the main components of a telephone service provider's network and an ISP's network used in establishing a dial-up connection to the Internet in conventional ISP systems having multiple telephone access numbers.

FIG. 2 shows Service Switching Points ("SSPs") 240, 250 and 260 connected to MLHGs 222a, 222b and 222c via PRI lines 241, 251 and 261, respectively. SSP 240 hosts telephone access number 222-444-1000, SSP 250 hosts access number 222-555-1000 and SSP 260 hosts access number 222-666-1000. In conventional systems, when caller 230 attempts to connect to ISP 220 by dialing telephone access number 222-444-1000, SSP 211 sends a call setup message to SSP 240. The call setup message is transmitted via Common Channel Signaling System 7 ("SS7") network 213. SSP 240 determines whether any lines are available going into MLHG 222a. If there are no lines available, i.e., all lines in PRI 241 are "off-hook," caller 230 receives a busy signal.

ISP 220 has two additional telephone access numbers and corresponding MLHGs which caller 230 may use to obtain access. FIG. 2 shows each telephone access number residing on individual SSPs. However, as would be apparent to those skilled in the art, an SSP can support multiple telephone access numbers. In conventional systems, if caller 230's initial attempt to access ISP 220 results in a failed connection, caller 230 will have to redial either the same telephone access number or one of the additional numbers. Of course, caller 230 must be aware of the additional numbers and must reconfigure the communications software on computer 231 to dial the additional numbers.

Even if caller 230 is aware of and tries the other telephone access numbers there is little assurance that a line will be available and caller 230's efforts may be wasted. For example, suppose caller 230 makes another attempt to connect to ISP 220, this time by dialing 222-555-1000. As before, if there are no available lines going into MLHG 222*b*, the call is not terminated and caller 230 receives a busy signal. Even if a line is available and the call is terminated, i.e., connected, a subscriber will not have a successful connection if the ISP does not answer the call. As noted above, if the call is not successful, caller 230 will have to hang up and make another attempt to connect to the ISP. In this example, on caller 230's third attempt, the telephone access number used is 222-666-1000. As described above, SSP 211 sends a call setup message to SSP 260. In this example, at least one voice channel is available in PRI lines 261 going into MLHG 222*c*. In this case, SSP 260 presents the call to the ISP. Access server 223 must answer the call and perform the user authorization functions described above.

In this example, caller 230 had to make three separate telephone calls before establishing a successful connection to the ISP. Such multiple attempts can be frustrating because of the time and effort required on the caller's part. An automated system and method increasing a subscriber's chances of successfully connecting to the ISP without manual intervention by the caller is desirable.

Using conventional methods, such enhanced Internet connection could be provided by allocating a special modem pool to support "premium" subscribers. Such premium subscribers could include, e.g., those subscribers willing to pay more for the enhanced service, ISP employees, or commercial subscribers having large accounts with the ISP. In this conventional method, the ISP could increase the line to user ratio from 1:10 to a ratio much closer to 1:1 for the special modem pool by controlling the number premium subscribers or by adding new modems whenever the premium subscribers outnumber the existing modem pool capacity. Thus, whenever a premium user dials the telephone access number for the special modem pool, a line should be available. However, if an entire modem pool is set aside exclusively for premium subscribers, the ISP's resources may be underutilized. For example, many lines in the reserved modem pool may sit idle while the ISP's other modem pools may be saturated with calls. As noted above, the cost of maintaining such resources is high, therefore efficient utilization of all modem pools is desirable. Another problem with this conventional solution, i.e., the setting aside of reserved modem pools, is that the ISP would have to develop a means to control access to the reserved pool so that only premium customers are allowed.

One conventional way to control access to the special modem pools is to keep the special access number secret and provide it only to premium subscribers. However, it is very difficult to maintain secrecy of such a "secret" number, and it will likely be public in a short period. Thus, the ISP would have to continually update the secret number and redistribute it to authorized premium subscribers.

Another conventional way to control access to the reserved modem pool is to implement additional user authorization and verification systems. Such systems ensure the subscriber is a valid ISP subscriber and verify that the subscriber is authorized to use the special telephone access number. If the additional authorization scheme is based on the subscriber's username, the ISP must answer the call before it can determine whether the caller is a premium subscriber. After the ISP answers the call, the caller must transmit a username (and usually a password) to the ISP and wait for authorization by the ISP. In this system, the telephone line is tied up while the ISP determines whether to allow access to the caller through this MLHG. Alternatively, the additional authorization scheme could be based on the subscriber's telephone number. In such a case, access server 23 is programmed to compare the caller's Calling Party Number (CgPN) with records stored in a database (not shown) to determine whether or not the user is a premium subscriber. The ISP would then only answer the call if the CgPN was matched with a premium subscriber.

In either case, even if the calling party is a premium subscriber, the ISP cannot grant access if the call never reaches the ISP. (As will be case if all of the lines in the special MLHG are busy). Thus, even if the ISP has available lines in another MLHG, a premium subscriber will be denied access if the special MLHG is full. In this case, the call will not be terminated, and the ISP cannot redirect the call to a different MLHG. Similarly, if the caller is not a premium subscriber, the ISP can only reject the call (i.e., deny authorization, or refuse to answer the call). In this case, a "regular" subscriber, i.e., a non-premium valid subscriber, must redial using an unrestricted telephone access number.

There are additional problems with this type of conventional solution: (1) the ISP cannot rapidly reconfigure the modem pools to shift premium and non-premium users to underutilized MLHGs; (2) the additional cost to implement and manage such complex systems undermines the ISPs objective to minimize overhead costs; and (3) the growth of disparate modem pools is less cost effective.

SUMMARY OF THE INVENTION

Figure 3:
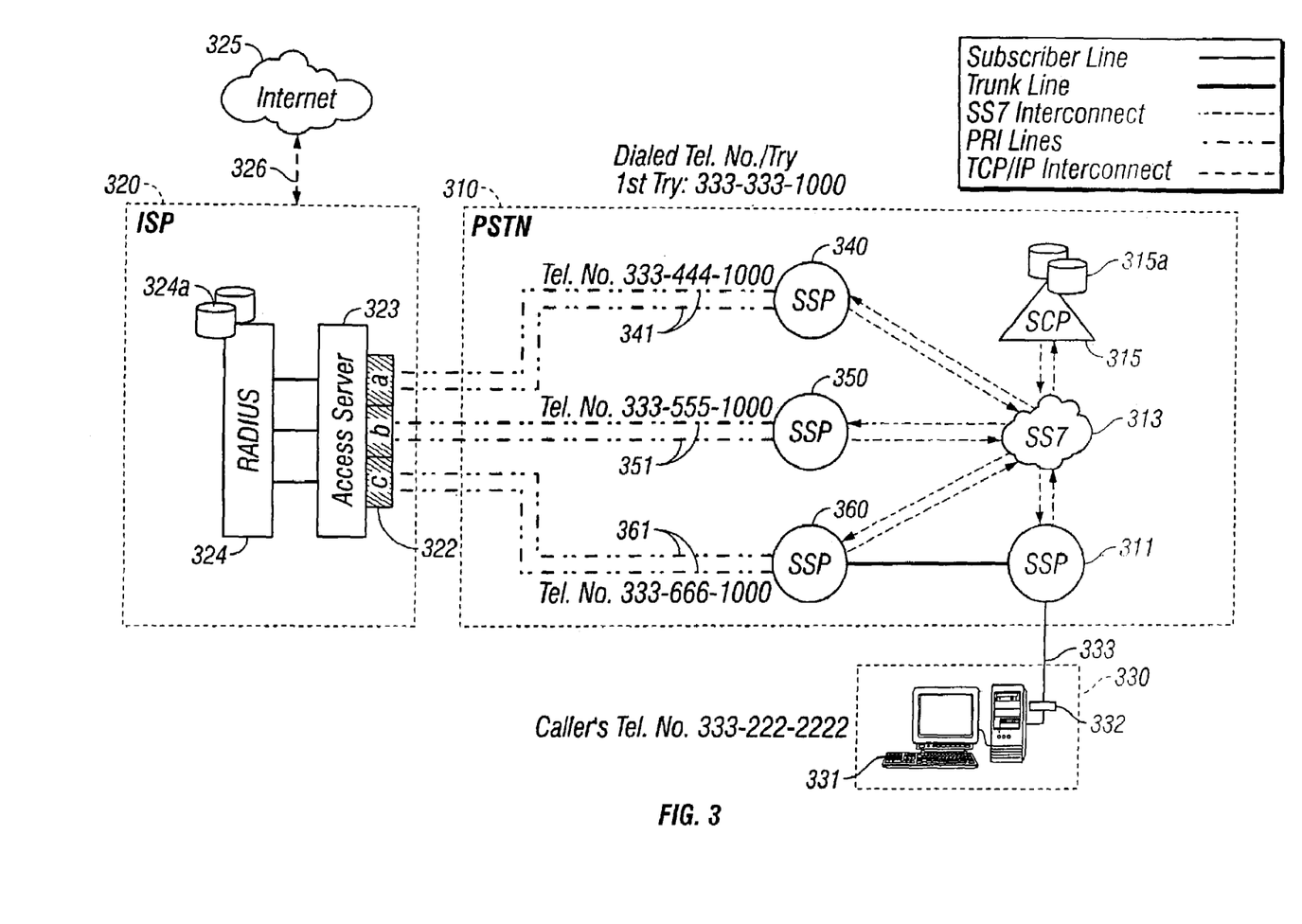
FIG. 3 is a schematic diagram of the main components of a telephone service provider's telephone network utilizing an Advanced Intelligent Network and an Internet Service Provider's network used in establishing a dial-up connection according to the present invention.
Figure 4A:
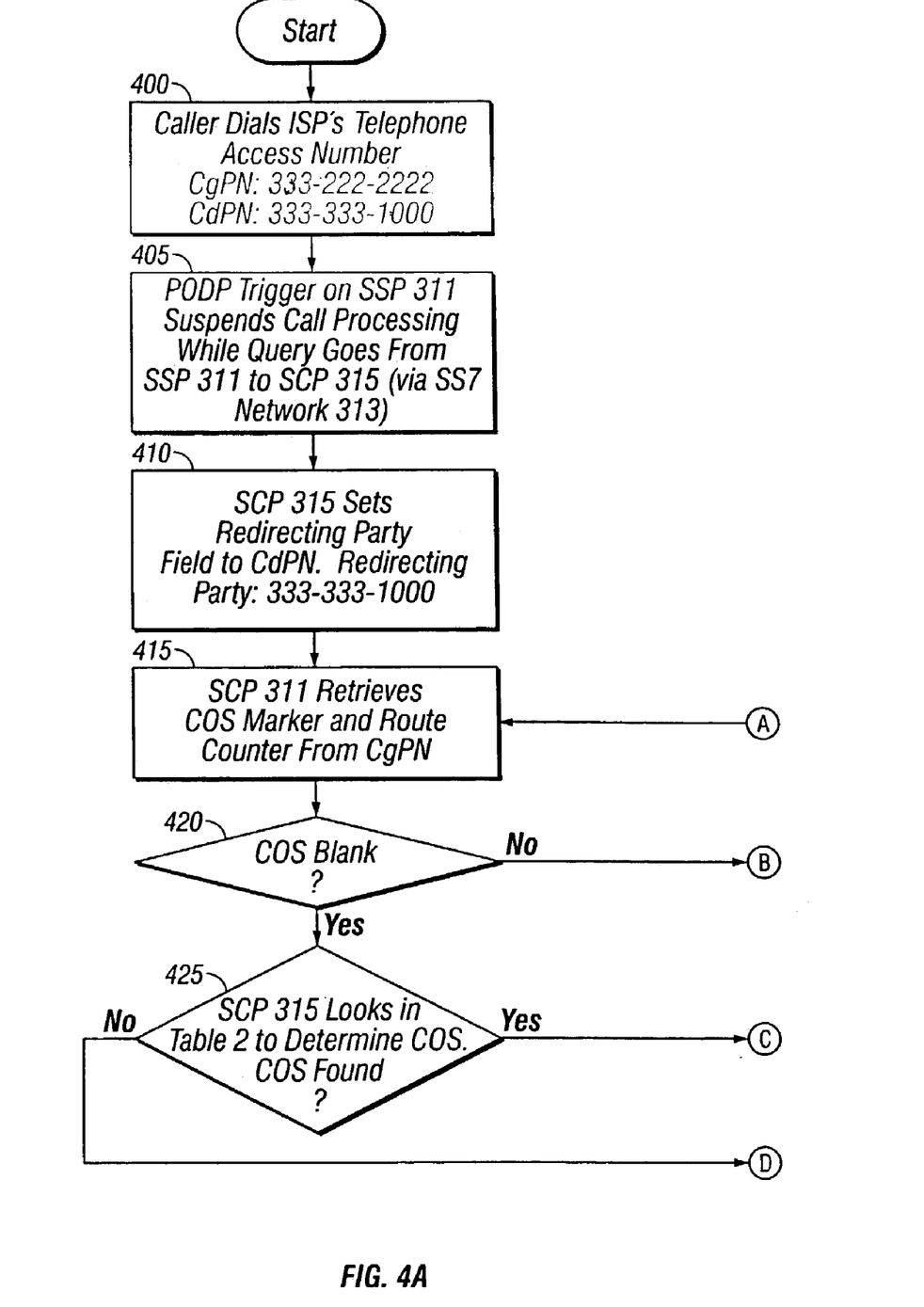
FIG. 4 is a flow diagram showing the steps executed in an example illustrating one embodiment of the present invention.
Figure 4B:
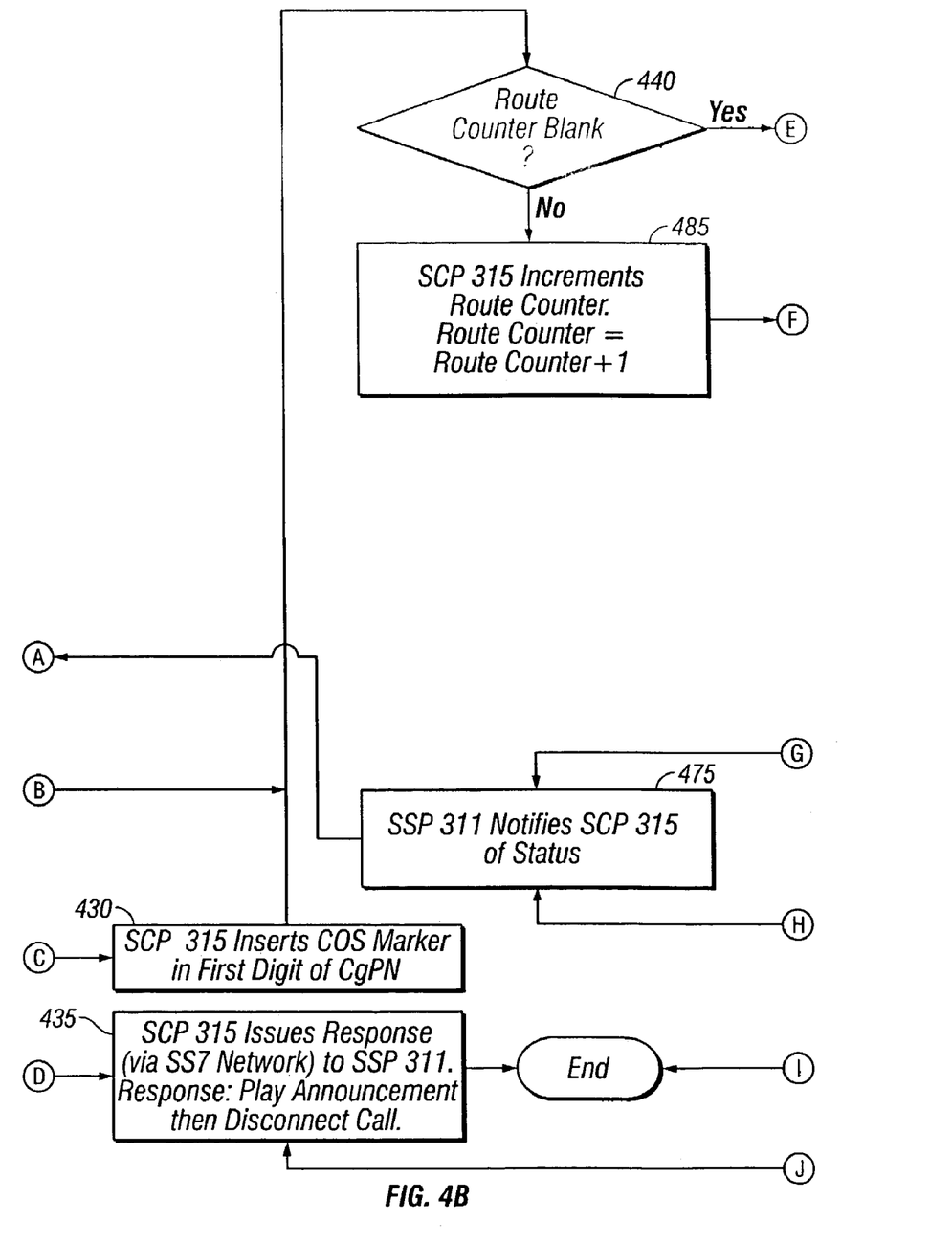
Figure 4C:
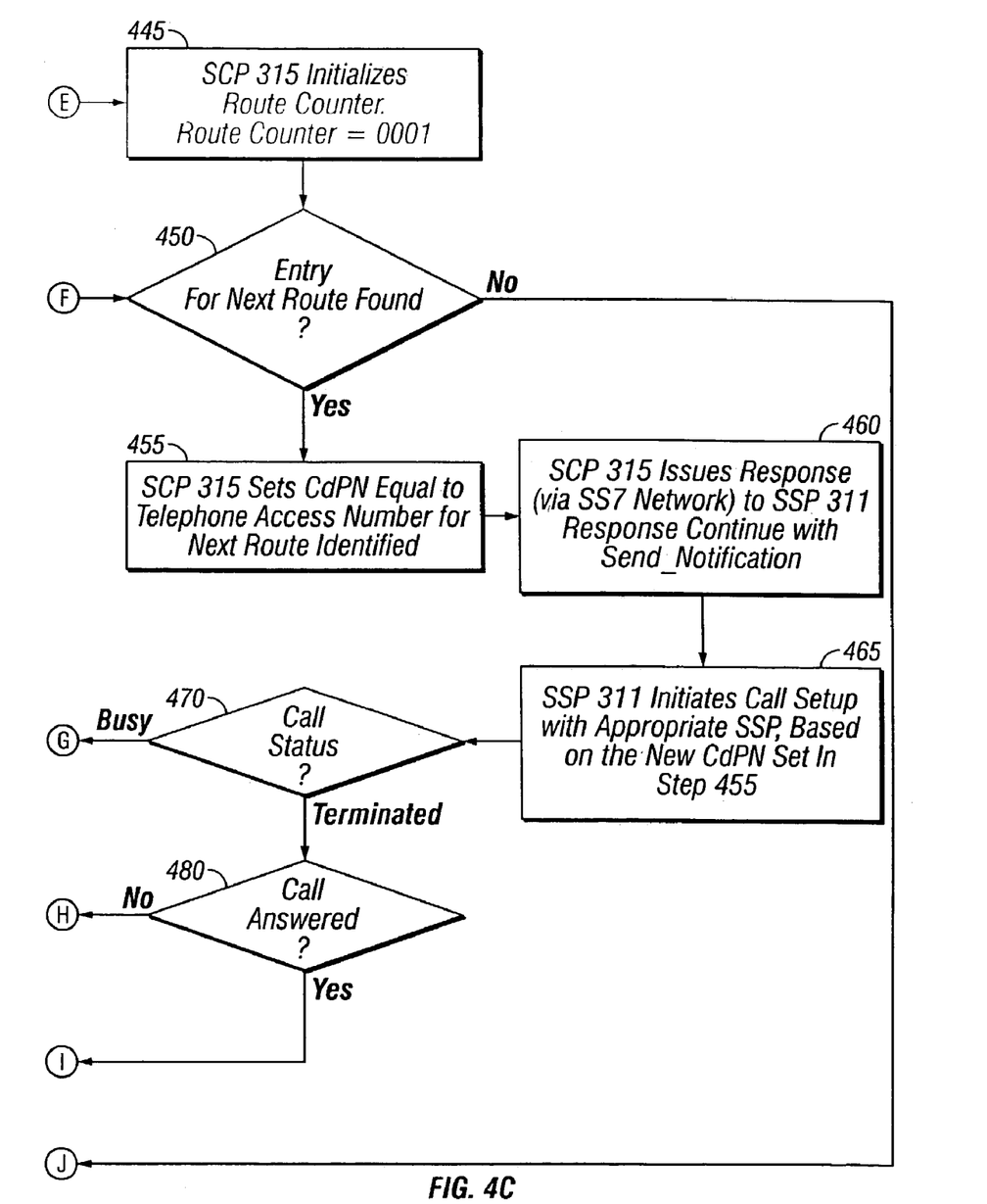

The present invention is a system and method for providing subscribers with enhanced Internet service connection. The present invention utilizes an Advanced Intelligent Network ("AIN") to set up and manage the services as described below. AIN systems are described in U.S. Pat. Nos. 5,701,301, 5,774,533 and Bellcore Specifications TR-NWT-001284, Switching Systems Generic Requirements for AIN 0.1 and GR-1298, AINGR: Switching Systems, which are incorporated herein by reference in their entirety. FIG. 3 shows the important components of the AIN used in the present invention. FIG. 4 is a flowchart detailing the steps performed in a preferred embodiment of the present invention. The steps described herein can be performed by computer-readable program code operating on the various AIN components and other computer systems, as described below.

According to the present invention, an ISP may designate several different levels, or classes of service. For example, the ISP may offer platinum, gold, silver and bronze services. The present invention marks calls to the ISP according to the caller's class of service ("COS"). This COS marker distinguishes calls initiated by users in one class from calls initiated by users in another class. Such differentiation of calls provides two levels of enhanced ISP connections. The telephone service provider ("telco") can use the COS to determine the best route for each individual call. The telco makes this determination using a COS routing scheme provided by the ISP. In a preferred embodiment, the COS scheme is an ordered list indicating the ISP's priorities for serving subscribers in the various classes. Once a call has been routed to the ISP, the ISP can determine the COS prior to answering the call and can make a business decision whether or not the call should be answered.

Preferably, the present invention is implemented as an AIN service application. At least one telephone access number assigned to an ISP is provisioned with a suitable AIN trigger on a switch. The telephone access number(s) is/are known and available to all of the ISP's subscribers. When a subscriber calls such a "public" telephone access number, the trigger is activated and the call is suspended while a database query is processed by a Service Control Point ("SCP"). The SCP uses the subscriber's telephone number (i.e., calling party number ("CgPN")) and the ISP's telephone number (i.e., called party number ("CdPN")) to determine the COS for the call. The SCP marks the call with a COS marker and a route counter as described below. After marking the call, the SCP changes the CdPN to a "private" telephone access number determined according to the route counter and COS.

Call processing continues using the new calling parameters, including the COS marker. Because the ISP is connected to the telco's switches via PRI lines, signaling traffic is transmitted to the ISP on a separate signaling channel. Thus, the COS marker is made available when the call is presented to the ISP. If call is not terminated, i.e., not answered or rejected due to lack of facilities, the call is again suspended while another database query is processed. Unlike conventional systems, the caller does not automatically receive a busy signal if the first telephone access number is busy. Instead, all other telephone access numbers available for the class of service are tried.

As noted above, once the call is presented, the ISP may choose not to answer the call based on the COS marker. The ISP may have a pre-set threshold of users from each class or may dynamically allocate slots for each class depending on the overall load on the ISP's resources. For example, suppose an ISP provides Class A, Class B and Class C service to it subscribers. In this example, the ISP maintains three different MLHGs ($MLHG_1$, $MLHG_2$ and $MLHG_3$), each supporting 100 simultaneous calls. Each MLHG is assigned a "private" telephone access number, i.e., the telephone access numbers will not be used by subscribers for direct dial-access to the ISP. Further, under the ISP's COS scheme Class A users will be routed to the MLHGs in the following order: $MLHG_1$, $MLHG_2$ then $MLHG_3$. Similarly, Class B users will be connected to $MLHG_1$, $MLHG_2$ then $MLHG_3$. Class C users will be connected only to $MLHG_3$. As will be apparent in the following description, although Class A and Class B users have identical priority schemes, the ISP can use the class of service to determine whether the call should be answered.

In a preferred embodiment, the SCP tags the call by appending a COS marker and a route counter to the beginning of the CgPN field. The route counter identifies which private telephone access number is used in the call setup message as described below. Because the COS marker is appended to the CgPN field, the ISP can identify the COS without actually answering the call. The ISP's access server uses the COS to decide whether the call will be answered.

If the switch offers the call to the modem pool, and it is rejected for lack of facilities, the SSP suspends the call and queries the SCP for additional routing instructions. The SCP retrieves the COS marker and the route counter from the CgPN field and looks up the next private telephone access number based on the subscriber's COS and current route counter. In a preferred embodiment, the route counter tracks the telephone access numbers by counting the position in the ordered list in the COS scheme. In this embodiment, if the route counter is greater than the number of telephone access numbers listed for that particular COS, the subscriber receives a busy signal because all routes have been exhausted.

Thus, the present invention provides enhanced connection to an ISP by allowing subscribers to dial a single telephone access number for reaching the ISP. The invention further provides enhanced connection management for the ISP operator enabling it to dynamically accept or reject subscribers on a class basis to balance the load. For example, in the system described above, if 40 If the available 100 lines into $MLHG_1$ are currently being used by Class A subscribers, and 50 lines are being used by Class B subscribers, the ISP may decide to reject all future Class B subscribers accessing $MLHG_1$ thereby leaving more slots in $MLHG_1$ for the higher premium Class A users. If the ISP does not answer the call, the next route in the subscriber's COS scheme is checked. Thus, even if the ISP rejects a Class B subscriber on one route, the call does not immediately result in a failed connection. If all lines in $MLHG_1$ are busy, Class A users will next try $MLHG_2$, if available, then $MLHG_3$. Class A users will receive a busy signal only after every avenue of access has been exhausted. In contrast, a regular (or in this case, Class C) user will receive a busy signal after trying only $MLHG_3$.

It is an object of the present invention to provide enhanced connection services for subscribers of Internet Service Providers.

It is a further object of the present invention to enable an Internet Service Provider to identify a caller's class of service prior to answering the call.

It is a further object of the present invention to use the resources of a telephone service provider to route calls to an Internet Service Provider according to the caller's class of service.

These and other objects of the present invention are described in detail in the description of the invention, the appended drawings and the attached claims.

DETAILED DESCRIPTION OF THE INVENTION

FIG. 3 shows the components of the AIN used in the present invention, including SSPs 311, 340, 350 and 360, SCP 315, and SS7 data network 313. SSP 311 serves caller 330 and SSPs 340, 350 and 360 serve ISP 320. It would be apparent to those skilled in the art that the subscriber and ISP can be served by the same SSP. Similarly, the ISP can be served by a single SSP. SCP 315 responds to queries from the SSPs using database 315a and service package applications ("SPAs"), i.e., software systems running on SCP 315.

In addition to the AIN components, FIG. 3 shows ISP 320 connected to the Internet 325 by interconnect 326. In a preferred embodiment of the present invention, communications over interconnect 326 follows the well-known TCP/IP protocol. As shown in FIG. 3, ISP 320 has telephone access numbers 333-444-1000, 333-555-1000 and 333-666-1000 served by SSPs 340, 350 and 360, respectively. ISP 320 is connected to PSTN 310 via PRI lines 341, 351 and 361 and MLHG 322a, 322b and 322c, respectively. Access server 323 controls the MLHGs and uses RADIUS server 324 and database 324a for verification and authorization of users before granting access to the ISP's resources.

Database 315a, on SCP 315, stores and tracks the data required implementing a preferred embodiment of the present invention. Preferably, database 315a includes one or more tables such as those shown in Tables 1 and 2. It would be apparent to one skilled in the art that other database table configurations for storing information used by SCP 315 can be implemented.

The present invention provides a hierarchy for routing subscribers to ISP 320's telephone access numbers according to the subscriber's class of service and the ISP's preference for handling individual classes of service. AIN queries and responses are used to route calls to the best MLGH, i.e., the best telephone access number according to the ISP's COS scheme. AIN queries and responses are well known to those skilled in the art. SCP 315 determines the best route by consulting database 315a. SCP 315 uses and manipulates the data in the CgPN and CdPN fields of a call setup message to determine and implement the best route. In addition, SCP 315 tracks routes already tested by inserting a route counter into a portion of the CgPN field. This feature of the present invention prevents the procedure from entering an infinite loop.

The CgPN field is used by SCP 315 to determine the caller's actual telephone DN as well as the caller's COS and route counter. Under the current AIN implementation, the CgPN field has a length of 15 digits. Currently, telephone numbers use only ten of those digits. Thus, five digits are available for other uses. In one embodiment of the present invention, the first digit is used to indicate the COS for the call. For example, Class A could be designated by inserting "1" as the first digit of the CgPN. Similarly, Class B could be designated by inserting "2," Class C by inserting "3" and so on.

The remaining four digits of the CgPN field are used to store the route counter, which keeps track of the routes, or telephone access numbers (i.e., the MLHGs) used in each attempt to obtain a successful connection for the call. SCP 315 compares the route counter with the ISP's COS scheme to determine whether another route is available. If the COS scheme has been exhausted, i.e., no routes remain for the call, SCP 315 instructs the SSP to send a busy signal to the caller, indicating an unsuccessful connection. Thus, the present invention tries each route according to the ISP's COS scheme until the call is connected and answered. However, in a preferred embodiment, if all routes have been tried without success, the algorithm stops and the caller receives a busy signal. In an alternate embodiment, the caller is given an option to start the search process over again.

The example presented below demonstrates how the system and method of the present invention operate to provide the services described above. The system described in the example can be understood with reference to FIG. 3. Further, steps described herein are detailed in the flowchart shown in FIG. 4. The example describes only one specific implementation of the present invention, however, those skilled in the art can implement the present invention using many variations of the steps described below.

EXAMPLE

In the following example ISP 320 offers Class A, Class B and Class C service to its subscribers. ISP 320 maintains three different private telephone access numbers corresponding to MLHG 322a, MLHG 322b and MLHG 322c, as shown in FIG. 3. Each MLHG supports up to 100 simultaneous calls. Table 1 shows a first embodiment for storing the COS schemes of multiple ISPs. As noted above, the COS scheme is an ordered list and is used to determine the ISP's priorities for each COS. In a preferred embodiment, the list comprises the private telephone access numbers available for each class, in the order of the ISP's preference. In alternate embodiments, the COS scheme could comprise, e.g., a list of SSP's supporting the ISP or any other means to identify the ISP's priority scheme for each class.

Table 1 is a database table maintained in database 315a. Preferably, database 315a also has a table for tracking the class of service assigned to each subscriber. Table 2 shows an example of the subscriber data used in a preferred embodiment of the present invention. Preferably, the data in Table 2 is stored in pre-existing database tables maintained by the telco. Table 2 shows three different telephone customers (i.e., subscribers), the ISP's public telephone access numbers used by each and the class of service to which each subscriber belongs.

As noted earlier, ISP 320 has a public telephone access number provisioned with an AIN trigger. In the present example, a Public Office Dialing Plan ("PODP") trigger is provisioned on SSP 311 for public telephone access number 333-333-1000. Thus, when caller 330 dials the access number (step 400), normally using computer 331 and modem 332, the PODP trigger is activated. SSP 311 suspends the call and issues a database query to SCP 315 (step 405). The database query is a standard AIN query initiated by the PODP trigger and includes, e.g., a CgPN field, a CdPN field, and a Redirecting Party Number field. The query is transmitted between SSP 311 and SCP 315 via SS7 network 313. In response to the query, SCP 315 routes the call to an appropriate telephone access number for the ISP. As is known in the art, when such rerouting occurs, the Redirecting Party Number field is set to the original called party. Thus, as shown in step 410, the ISP's public telephone access number, (i.e., the CdPN) is written in the Redirecting Party Number field. In this example, the Redirecting Party Number field becomes "3333331000". Thus SCP 315 can always identify which ISP the caller is trying to access. In step 415, SCP 315 retrieves the COS marker and the route tracker from the first five digits of the CgPN as described above.

Steps 415–480, are iterative, i.e., these steps may be executed more than one time during processing of a single user's call to the ISP. The first time step 415 is executed, the COS marker and route counter are blank because the leading five digits of the CgPN have not been changed yet. That is, the COS marker is "_" and the route counter is "- - - -." In step 420, SCP 315 determines that the COS marker has not been set, i.e., is blank, so SCP 315 moves on to step 425. In step 425, SCP 315 uses Table 2 in database 315a to determine the caller's class of service. SCP 315 looks for both the CgPN and the Redirecting Party Number in Table 2 because a caller may subscribe to more than one ISP.

If the CgPN and the Redirecting Party Number are located together in Table 2, the COS marker is determined. In this example, the original CgPN is 333-222-2222 and the Redirecting Party Number is 333-333-1000, so the subscriber's COS marker is "1" (Table 2, row 1). In step 430, SCP 315 inserts the COS marker into the CgPN field. Thus, the CgPN field becomes: "1_ _ _ _3332222222." After setting the COS marker, SCP 315 moves on to step 440, described below. If, in step 425, the CgPN and the Redirecting Party Number could not be located together in Table 3, the caller does not have an assigned COS. Under the ISP's COS scheme, the call is to be disconnected. Thus, in step 435, SCP 315 sends a response instructing SSP 311 to play an announcement to caller 320 then disconnect the call. In a preferred embodiment, the announcement message informs the caller that the ISP requires customers to choose a class of service and offers the option to sign-up for a COS.

In this example, the COS was successfully located in step 425 and the COS marker was inserted into the CgPN in step 430. In step 440, SCP 315 checks to see if the route counter was already set in a previously executed step. In the first iteration of step 440, the route counter is blank so SCP 315 initializes the counter in step 445. SCP 315 initializes the route counter by setting it to "0001." As discussed above, the route counter is inserted into the second through fifth digits of the CgPN field. Thus, SCP 315 sets the CgPN field to: "100013332222222."

In the next step (step 450), SCP 315 looks up the priority scheme by locating the ISP's public telephone access number (i.e., the Redirecting Party Number) and the COS marker in Table 1. In this example, the subscriber's COS is "1" and the ISP's public telephone access number is 333-333-1000, so, the priority scheme is: 333-444-1000, 333-555-1000, 333-666-1000. Once the COS scheme is located, SCP 315 checks to see if the route counter is greater than the number of telephone access numbers provided for the caller's class of service. In the present example, the route counter is still set to "0001" and there are three telephone access numbers in the Table 1 for a Class A subscriber, so SCP 315 moves on to step 455.

In step 455, SCP 315 changes the CdPN field to the telephone access number corresponding to the route counter. In this example, since the route counter was initialized to "0001" in the preceding step and the COS marker is set to "1," the CdPN will be the first telephone access number in Table 2 corresponding to a Class A user of ISP 320. Thus, in step 455, the CdPN field becomes: 334441000. In step 460, SCP 315 issues a response to SSP 311 comprising a Continue message (i.e., continue call processing) and a Send_Notification message (i.e., a request for Termination_Notification from the SSP). The Continue message has the CgPN and CdPN fields set as described above. In step 465, SSP 311 continues call processing by sending a call setup message, i.e., an Initial Address Message ("IAM"), to the appropriate SSP, depending on the new CdPN. Thus, in the present example, SSP 311 sends an IAM to SSP 340, which serves telephone access number 333-444-1000.

In step 470, the call status determines the next step to be taken. If the call is not terminated because all lines in PRI 341 are busy, step 475 is executed as described below. If the call is terminated, i.e., presented to the ISP via PRI 341, then step 480 is executed. Even if the call is terminated, it must be answered by the ISP in order to be a "successful" connection. As shown in step 480, if the call is answered the algorithm is complete.

Because the present invention marks all calls to ISP 320 by changing the call setup parameters, ISP 320 can determine the COS without answering the call. Using this information, the ISP can decide whether to answer the call. For example, the ISP may determine that there are already enough users of the caller's class connected through a given MLHG. In this case, the ISP may decide that no further callers from that class will be allowed via this route. Thus, ISP 320 programs access server 323 to ignore calls from that class of user. If a call is not answered, SSP 311 moves on to step 475, described below.

As noted above, step 475 is executed if the call is rejected (i.e., lines are busy or unanswered). In the present example, SSP 311 has sent an IAM to SSP 340. In response, SSP 340 informs SSP 311 that all lines in PRI 341 are busy (step 470). Thus, SSP 311 moves on to step 475 where SSP 311 notifies SCP 315 that the call was rejected. Upon receiving the notice, SCP 315 returns to step 415 where SCP 315 retrieves the COS marker and route counter.

In step 420, SCP 315 again determines whether or not the COS marker is blank. In this example, the COS marker is not blank because it was previously set to "1." Thus, after step 420, SCP 315 moves on to step 440 where SCP 315 again determines whether the route counter is blank. Recall that in step 445, executed during the first iteration of the algorithm, the route counter was set to "0001," thus, the second time step 440 is executed, the route counter is not blank, so the next step is step 485. In step 485, SCP 315 increments the route counter by adding 1 to the current route counter. In this example, the route counter becomes "0002." In step 450, SCP 315 again checks the compares the route counter to the ISP's COS scheme in Table 2 to see if the route counter is greater than the list size for routes for the class of user. Again, there are three routes listed for a Class A user. Thus the route counter, currently set to "0002," is not greater than the list size.

In step 455, SCP 315 looks in Table 2 to determine the next route to try based on the route counter. In this example, with the route counter set to "0002" and the Redirecting Party Number field set to "3333331000," the next route is telephone access number 333-555-1000.

After determining the next route, SCP 315 updates the CdPN field with the new telephone access number. Thus, in step 455, the CdPN field becomes "3335551000," the telephone access number for MLHG 322b. As described above, in step 460, SSP 311 initiates call setup with SSP 350. If the call is terminated and answered, the process is complete. However, as before, if the call is not terminated or is not answered, the system returns to step 415 and repeats the steps thus described.

If, in step 450 the route counter is greater than the list size for routes in Table 2 corresponding to the class of service, the call results in a failed connection. In this case, SCP 315 moves on to step 430 and instructs SSP 311 to play an announcement to caller 330, then disconnect the call. In an alternate embodiment, SCP 315 instructs SSP 311 to offer the caller the option of restarting the search for an open line to the ISP. In this case, the route counter would be reset to blanks, i.e., "- - - ," and SCP 315 returns to step 415. In another alternate embodiment, SSP 311 provides a busy signal to the caller.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

I claim:

1. A system for marking a subscriber's call with a class of service marker and routing the call to an internet service provider according to a subscriber's class of service, the system comprising:
   a first service switching point connected to a subscriber telephone line;
   a second switching point connected to a plurality of internet service provider telephone lines; and
   a service control point in communication with the first and second service switching points, the service control point including a database that associates a subscriber telephone number with a class of service,
   wherein when a subscriber calls a public telephone access number, the service control point determines the class of service for the subscriber according to records in the database, and marks the call with a class of service marker, wherein the first service switching point processes the subscriber's call with the second service switching point, the call is directed to one of a plurality of private telephone access numbers to the internet service provider according to the class of service marker on the subscriber's call.

2. The system of claim 1, wherein the private telephone access numbers give different levels of preferential access to the internet service provider.

3. The system of claim 2, wherein the subscriber's call is connected by the internet service provider if the internet service provider determines that there is a connection line open for the subscriber's class of service.

4. The system of claim 1, wherein the internet service provider maintains a given number of connection lines for different classes of services.

5. The system of claim 4, wherein the internet service provider maintains a hierarchy of availability of connection lines according to classes of service.

6. The system of claim 5, wherein one class of service subscriber may be given access to a connection line to the internet service provider although another class of service subscriber may be rejected.

7. The system of claim 1, wherein service control point routes the subscriber's call to an alternative private telephone access number if the one of the plurality of private telephone access numbers does not connect the call to the internet service provider.

8. A system for marking a subscriber's call with a class of service marker and routing the call to an internet service provider according to a subscriber's class of service, the system comprising:
   a first service switching point connected to a subscriber telephone line;
   a second switching point connected to a plurality of internet service provider telephone lines; and
   means for controlling service in communication with the first and second service switching points, the means for controlling service having ability to associate a subscriber telephone number with a class of service,
   wherein when a subscriber calls a public telephone access number, the means for controlling service determines the class of service for the subscriber, and marks the call with a class of service marker, wherein the first service switching point processes the subscriber's call with the second service switching point, the call is directed to one of a plurality of private telephone access numbers to the internet service provider according to the class of service marker on the subscriber's call.

9. The system of claim 8, wherein the private telephone access numbers give different levels of preferential access to the internet service provider.

10. The system of claim 9, wherein the subscriber's call is connected by the internet service provider if the internet service provider determines that there is a connection line open for the subscriber's class of service.

11. The system of claim 8, wherein the internet service provider maintains a given number of connection lines for different classes of services.

12. The system of claim 11, wherein the internet service provider maintains a hierarchy of availability of connection lines according to classes of service.

13. The system of claim 12, wherein one class of service subscriber may be given access to a connection line to the internet service provider although another class of service subscriber may be rejected.

14. The system of claim 8, wherein the means for controlling service routes the subscriber's call to an alternative private telephone access number if the one of the plurality of private telephone access numbers does not connect the call to the internet service provider.

* * * * *